(12) United States Patent
Staehling et al.

(10) Patent No.: US 7,899,072 B2
(45) Date of Patent: Mar. 1, 2011

(54) METHOD AND SYSTEM FOR NETWORK BANDWIDTH ALLOCATION

(75) Inventors: Nathan P. Staehling, Rowlett, TX (US); Michael Freiberger, Allen, TX (US); Donald Pitchforth, Jr., Rockwall, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 120 days.

(21) Appl. No.: 12/241,388

(22) Filed: Sep. 30, 2008

(65) Prior Publication Data

US 2010/0080244 A1   Apr. 1, 2010

(51) Int. Cl.
*H04L 12/28* (2006.01)
(52) U.S. Cl. ...................................... 370/431
(58) Field of Classification Search ............... 370/431, 370/437, 468
See application file for complete search history.

(56) References Cited

U.S. PATENT DOCUMENTS

| | | | |
|---|---|---|---|
| 6,205,154 B1 * | 3/2001 | Schmidt et al. | 370/458 |
| 2002/0021678 A1 * | 2/2002 | Heatwole et al. | 370/325 |
| 2002/0059408 A1 * | 5/2002 | Pattabhiraman et al. | 709/223 |
| 2002/0093975 A1 * | 7/2002 | Lin et al. | 370/442 |
| 2003/0179769 A1 * | 9/2003 | Shi et al. | 370/442 |
| 2003/0235153 A1 * | 12/2003 | Lee et al. | 370/229 |
| 2004/0052274 A1 * | 3/2004 | Wang et al. | 370/468 |

\* cited by examiner

*Primary Examiner*—Kwang B Yao
*Assistant Examiner*—Juvena Loo

(57) ABSTRACT

A method and system of an embodiment may include a method, comprising receiving, at a computing device, network bandwidth information for a network, receiving, at a computing device, a request for network bandwidth, identifying, at a computing device, one or more portions of network bandwidth to fulfill the request. The method may include provisioning the one or more identified portions of unallocated network bandwidth for the request. The identification may comprise utilizing the network bandwidth information to identify one or more portions of unallocated network bandwidth with sufficient capacity for the request, and determining which of the one or more portions of unallocated network bandwidth will result in less fragmentation of remaining unallocated network bandwidth.

13 Claims, 5 Drawing Sheets

500

| Timeslot | STS-12C | STS-3C | STS-1 | STS-1 | STS-3C | STS-1 | STS-1 | STS-12C | STS-3C | STS-1 | STS-1 |
|---|---|---|---|---|---|---|---|---|---|---|---|
| 1 | X | --- | --- | --- | --- | --- | --- | --- | --- | --- | --- |
| 2 | X | --- | --- | --- | --- | --- | --- | --- | --- | --- | --- |
| 3 | X | --- | --- | --- | --- | --- | --- | --- | --- | --- | --- |
| 4 | X | --- | --- | --- | --- | --- | --- | --- | --- | --- | --- |
| 5 | X | --- | --- | --- | --- | --- | --- | --- | --- | --- | --- |
| 6 | X | --- | --- | --- | --- | --- | --- | --- | --- | --- | --- |
| 7 | X | --- | --- | --- | --- | --- | --- | --- | --- | --- | --- |
| 8 | X | --- | --- | --- | --- | --- | --- | --- | --- | --- | --- |
| 9 | X | --- | --- | --- | --- | --- | --- | --- | --- | --- | --- |
| 10 | X | --- | --- | --- | --- | --- | --- | --- | --- | --- | --- |
| 11 | X | --- | --- | --- | --- | --- | --- | --- | --- | --- | --- |
| 12 | X | --- | --- | --- | --- | --- | --- | --- | --- | --- | --- |
| 13 |  | X | --- | --- | --- | --- | --- | --- | --- | --- | --- |
| 14 |  | X | --- | --- | --- | --- | --- | --- | --- | --- | --- |
| 15 |  | X | --- | --- | --- | --- | --- | --- | --- | --- | --- |
| 16 |  |  |  |  | X | --- | --- | --- | --- | --- | --- |
| 17 |  |  |  |  | X | --- | --- | --- | --- | --- | --- |
| 18 |  |  |  |  | X | --- | --- | --- | --- | --- | --- |
| 19 |  |  |  |  |  |  |  |  |  |  | X |
| 20 |  |  |  |  |  |  |  |  |  | X | --- |
| 21 |  |  |  |  |  |  | X | --- | --- | --- | --- |
| 22 |  |  |  |  |  | X | --- | --- | --- | --- | --- |
| 23 |  |  |  | X | --- | --- | --- | --- | --- | --- | --- |
| 24 |  |  | X | --- | --- | --- | --- | --- | --- | --- | --- |
| 25 |  |  |  |  |  |  |  | X | --- | --- | --- |
| 26 |  |  |  |  |  |  |  | X | --- | --- | --- |
| 27 |  |  |  |  |  |  |  | X | --- | --- | --- |
| 28 |  |  |  |  |  |  |  | X | --- | --- | --- |
| 29 |  |  |  |  |  |  |  | X | --- | --- | --- |
| 30 |  |  |  |  |  |  |  | X | --- | --- | --- |
| 31 |  |  |  |  |  |  |  | X | --- | --- | --- |
| 32 |  |  |  |  |  |  |  | X | --- | --- | --- |
| 33 |  |  |  |  |  |  |  | X | --- | --- | --- |
| 34 |  |  |  |  |  |  |  | X | --- | --- | --- |
| 35 |  |  |  |  |  |  |  | X | --- | --- | --- |
| 36 |  |  |  |  |  |  |  | X | --- | --- | --- |
| 37 |  |  |  |  |  |  |  |  | X | --- | --- |
| 38 |  |  |  |  |  |  |  |  | X | --- | --- |
| 39 |  |  |  |  |  |  |  |  | X | --- | --- |
| 40 |  |  |  |  |  |  |  |  |  |  |  |

Fig. 5

METHOD AND SYSTEM FOR NETWORK BANDWIDTH ALLOCATION

BACKGROUND INFORMATION

When provisioning bandwidth across a network, one or more portions of concatenated network bandwidth may be required. Concatenated network bandwidth may require certain characteristics of bandwidth. For example, concatenated bandwidth may require contiguous portions of bandwidth. Network traffic may be allocated as demanded and may be filled with allocated bandwidth of different sizes. This may result in certain portions of bandwidth being allocated with gaps of unused bandwidth between the allocated bandwidth (i.e., fragmentation of bandwidth). Because bandwidth may be allocated in specified sizes conforming to standards, the gaps of unused bandwidth may not conform to a size which may be provisioned. Even if a gap conforms to a standard size which may be allocated, that size may not conform to the size of requests for network bandwidth. This may result in unused or wasted bandwidth.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 5 depicts a table of allocated bandwidth, in accordance with an exemplary embodiment.

DETAILED DESCRIPTION OF PREFERRED EMBODIMENTS

An exemplary embodiment provides a network bandwidth allocation system. The network bandwidth allocation system may enable efficient usage of one or more portions of network bandwidth.

The description below identifies servers, mobile devices, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other computing devices instead of or in addition to the function performed at the particular module. Further, the modules may be implemented across multiple devices and/or other components local or remote to one another. Additionally, the modules may be moved from one computing device and added to another computing device, and/or may be included in both computing devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, mobile devices, and network elements, etc.) separately. The functions described as being performed at various components may be performed at other components, and the various components may be combined and/or separated. Other modifications also may be made.

Figure 1:
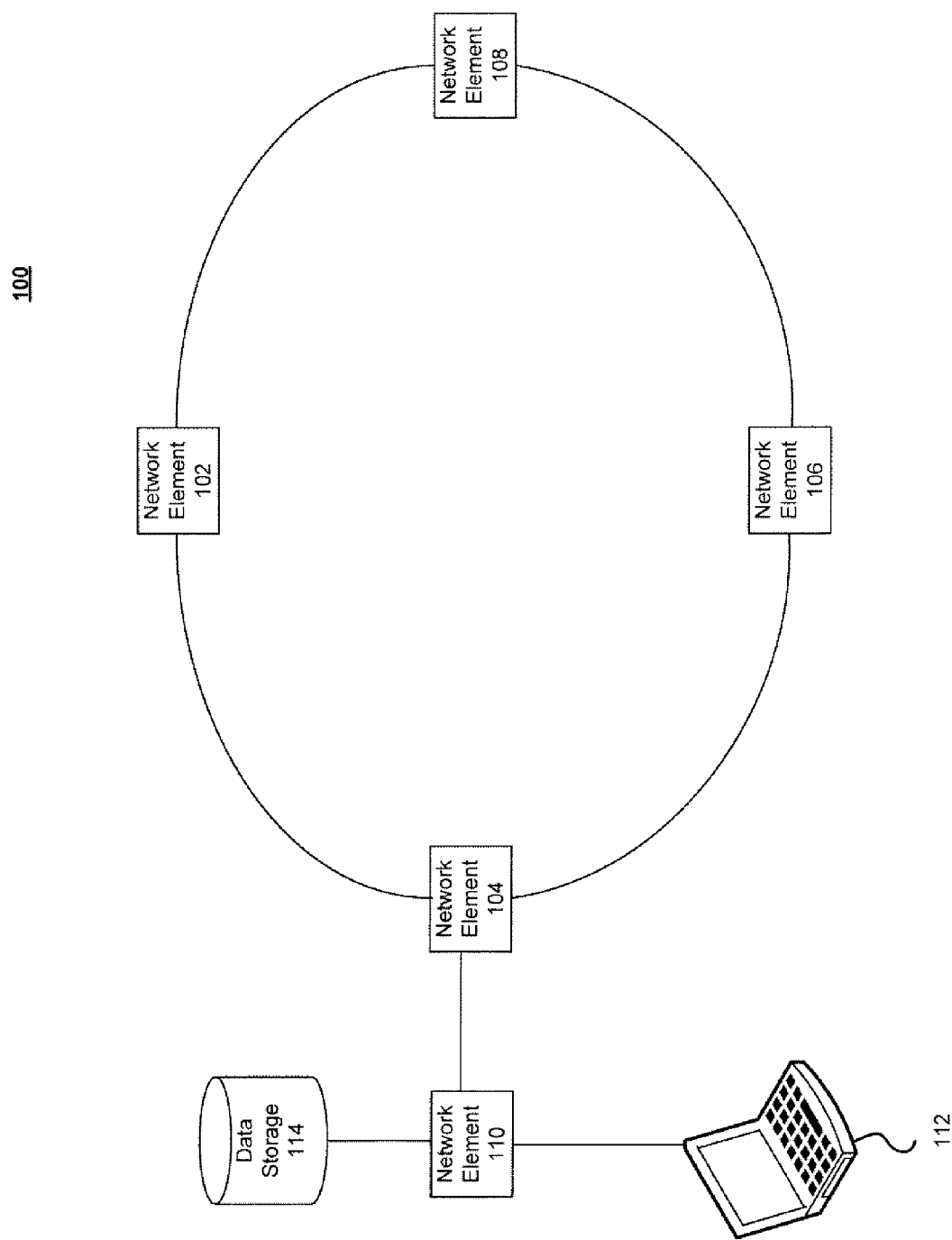
FIG. 1 is a block diagram of a network analysis system, in accordance with an exemplary embodiment.

Referring to FIG. 1, a block diagram of a network analysis system in accordance with an exemplary embodiment is illustrated. System 100 illustrates an exemplary system for analysis of a network, such as a private network. It is noted that system 100 is a simplified view of a network and may include additional elements that are not depicted. As illustrated, network elements 102, 104, 106, 108, and 110 may be communicatively coupled by network paths. Network elements 102, 104, 106, 108, and 110 may be communicatively coupled to other devices such as data storage 114 and the computer 112.

Network elements 102, 104, 106, 108, and 110 may transmit and/or receive data via network paths. The data may be transmitted and/or received utilizing a standard telecommunications protocol or a standard networking protocol. For example, data may be transmitted and/or received using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, TL1, SNMP (Simple Network Management Protocol) or other protocols and/or systems suitable for transmitting and receiving data. Data may be transmitted and/or received wirelessly or may utilize cabled network connections or telecom connections such as an Ethernet RJ45/Category 5 Ethernet connection, a fiber connection, a traditional phone wireline connection, a cable connection or other wired network connection. Network elements 102, 104, 106, 108, and 110 may use standard wireless protocols including IEEE 802.11a, 802.11b and 802.11g. Network elements 102, 104, 106, 108, and 110 may also be communicatively coupled via protocols for a wired connection, such as an IEEE Ethernet 802.3.

Network paths between network elements 102, 104, 106, 108, and 110 may be network connections utilizing Ethernet, Multi-Protocol Label Switching (MPLS) based Ethernet, Asynchronous Transfer Mode (ATM), Synchronous Optical Networking (SONET), Synchronous Digital Hierarchy (SDH), Plesiochronous Digital Hierarchy (PDH), Digital Subscriber Line (DSL), Asymmetric Digital Subscriber Line (ADSL), Symmetric Digital Subscriber Line (SDSL), Fiber To The Premises (FTTP), cable modem broadband, leased line, Integrated Services Digital Network (ISDN), dial-up, satellite, wireless networking, broadband over power lines and/or other network technologies.

Network elements 102, 104, 106, 108, and 110 may be one or more routers, switches, hubs, computing devices, and/or other network connectivity devices capable of transmitting and/or receiving network data. Network elements 102, 104, 106, 108, and 110 may include one or more processors (not shown) for recording, transmitting, receiving and/or storing data. Although network elements 102, 104, 106, 108, and 110 are each depicted as single network connectivity devices, it should be appreciated that the contents of network elements 102, 104, 106, 108, and 110 may be combined into fewer or greater numbers of network connectivity devices and may be connected to one or more data storage systems, such as data storage 114. Furthermore, network elements 102, 104, 106, 108, and 110 may be local, remote, or a combination thereof to each other. Network elements 102, 104, 106, 108, and 110 may be different portions of a network such as Add-Drop Multiplexers (ADM), regenerators, optical amplifiers, Digital Cross Connect Systems (DCS), edge nodes, core nodes, customer premise equipment, a hubbing node, edge devices, and integrated access devices or other network connectivity devices.

Network elements 102, 104, 106, 108, and 110 may provide application programming interfaces (APIs), interface tables, Remote Procedure Calls (RPCs), web services, Extensible Markup Language (XML) based interfaces, Simple Object Access Protocol (SOAP) based interfaces, Common Request Broker Architecture (CORBA) based interfaces, SONET based interfaces and other interfaces for sending or receiving network information.

Data storage 114 may be network accessible storage. Data storage 114 may be local, remote, or a combination thereof to network elements 102, 104, 106, 108, and 110. Data storage 114 may utilize a redundant array of inexpensive disks (RAID), a redundant array of inexpensive nodes (RAIN), tape, disk, a storage area network (SAN), and/or other computer accessible storage. In one or more embodiments, data storage 114 may be a database, such as an Oracle database, a Microsoft SQL Server database, a DB2 database, a MySQL database, a Sybase database, an object oriented database, a hierarchical database, and/or another database.

Data storage 114 may store files which may contain network information utilized to manage network bandwidth, report on network bandwidth, or provide other network management functionality. Data storage 114 may store data received from user input, a network management system, a network provisioning system, a management information base, a network services ordering system, a database, a file, a web service, and/or an application programming interface. In one or more embodiments, data storage 114 may be a management information base.

The computer 112 may be a desktop computer, a laptop computer, a server, a computing device, or other computer capable of performing private network backbone analysis. The computer 112 may receive data from user input, a network management system, a network provisioning system, a management information base, a network services ordering system, a database, a file, a web service, an application programming interface, and/or another interface capable of receiving network data. The computer 112 may query other systems and/or local or remote storage such as data storage 114 to obtain network information.

The computer 112 may provide a user interface to enable network bandwidth management and/or allocation. The user interface may enable a user to input data, edit data or view data related to network traffic, network bandwidth, and/or one or more network paths. In one or more embodiments, the user interface may display available and/or allocated bandwidth on one or more network fibers or SONET lines. The computer 112 may display a map, chart, table, or other data showing available timeslots and/or allocated timeslots for a particular fiber or SONET line. The computer 112 may enable a user to provision bandwidth by allocating one or more timeslots or containers. Allocating one or more timeslots may be done by a user selecting the one or more timeslots via the user interface. The computer 112 may enable a user to allocate contiguous timeslots which may provide concatenated bandwidth for services such as STS-3c (Synchronous Transport Signal-3, concatenated), STS-12c, STS-48c, STS-192c, etc. For example, the computer 112 may enable a user to allocate three contiguous timeslots of an OC (Optical Carrier)-48 for use by a STS-3c. The computer 112 may also enable the provisioning of single timeslots or containers, such as STS-1.

In addition to provisioning, the computer 112 may enable the migration of services from one portion of bandwidth to a second portion of bandwidth. For example, the computer 112 may enable the migration of allocated bandwidth from one or more timeslots to other timeslots. The migration of bandwidth or regrooming of bandwidth may enable the computer 112 to reduce fragmentation of bandwidth on a fiber optic line. Fragmentation may be considered the allocation of bandwidth on a network path, such as a fiber line, in a manner that leaves gaps of unused or unallocated bandwidth between the used or allocated bandwidth. Because bandwidth may be allocated in contiguous portions or timeslots for concatenated services, gaps having fewer than the required number of timeslots may not be utilized by concatenated services. For example, the provisioning of a STS-3c circuit may require three contiguous timeslots and the provisioning of a STS-12c may require twelve contiguous timeslots. Thus the allocation of bandwidth of a fiber optic line in a manner that leaves only portions of bandwidth with two or fewer timeslots may prevent the provisioning of higher speed circuits. Timeslots arranged in groups of two or fewer may be unused unless they are used by an STS-1 circuit. The computer 112 may thus enable a user to regroom some fiber lines by migrating or re-provisioning bandwidth to eliminate wasted timeslots.

In order to avoid fragmentation, the computer 112 may use one or more methods, processes, hardware components, and/or portions of executable code to automatically allocate bandwidth. The one or more methods, processes, hardware components, and/or portions of executable code may avoid the random allocation of bandwidth which may result in fragmentation. For example, the computer 112 may allocate timeslots. Timeslots may be allocated by the computer 112 executing different code or utilizing different hardware components depending on the type of bandwidth required. Individual timeslots, such as STS-1 circuits, may be allocated differently than circuits requiring concatenated bandwidth. In one or more embodiments, the determination of which of the one or more portions of unallocated bandwidth may result in less fragmentation of remaining unallocated network bandwidth may identify the highest numbered portion of unallocated bandwidth in the lowest quarter of network bandwidth which contains sufficient unallocated network bandwidth for the request. For example, the computer 112, when provisioning an STS-1 on an OC-192, may look first at timeslot forty-eight and may then look at lower numbered timeslots if timeslot forty-eight is allocated. If the first forty-eight timeslots are allocated, the computer 112 may look at the next quarter of bandwidth, or timeslots ninety-six through forty-nine, in that order. When provisioning concatenated bandwidth the computer 112 may use one or more methods, processes, hardware components, and/or portions of executable code. In one or more embodiments, the determination of which portion of unallocated bandwidth may result in less fragmentation of remaining unallocated network bandwidth may identify a number corresponding to a starting point of one or more portions of contiguous bandwidth by calculating (n*(Integer−1)+1), wherein n may represent the number of contiguous bandwidth portions requested and Integer may be a specified integer. For example, the computer 112, when provisioning an STS-3c, may specify two as an integer. Thus, the computer 112 may calculate (3*(2−1)+1)=4 and utilize the fourth timeslot for the start of the STS-3c. Because concatenated services such as STS-3c may require contiguous bandwidth, the computer 112 may allocate timeslots four, five and six to accommodate the STS-3c. If one of the timeslots is allocated, the computer 112 may increment the integer and may test the next three derived timeslots. The computer 112 may utilize this process for other speeds of circuits such as STS-12c, and STS-48c. Other methods, processes, hardware components, and/or portions of executable code may also be utilized.

In one or more embodiments, the computer 112 may perform regrooming or migration of existing bandwidth in order to defragment unallocated bandwidth. The computer 112 may first analyze existing allocated and unallocated bandwidth. The computer 112 may then generate a migration or regrooming plan to defragment unallocated bandwidth. Implementation of a plan may be designed to minimize the service disruption which may be caused by the migration of one or more portions of allocated bandwidth. For example, the migration may be scheduled on off peak times and/or during a scheduled maintenance window. In some embodiments, migration may use "bridge and roll" capabilities of optical networking equipment which may reduce a service disruption. In one or more embodiments, the computer 112 may enable certain portions of bandwidth, such as that allocated for a particular client or purpose, to be marked to indicate that the marked portion of bandwidth is not to be migrated. The computer 112 may also enable the marking of portions of bandwidth which are to be migrated.

In one or more embodiments, migration of bandwidth may be achieved by first migrating smaller portions of bandwidth. For example, the STS-1 circuits which are provisioned in lower timeslots may be moved first. In some embodiments, the STS-1 circuits may be moved to the highest available timeslot in the lowest quarter of bandwidth with unallocated bandwidth. After moving one or more circuits with lower bandwidth, circuits with higher bandwidth may be migrated. For example, STS-3c circuits may be migrated using one or more methods, processes, hardware components, and/or portions of executable code. In some embodiments, migration of bandwidth may occur by moving progressively larger classes of bandwidth, such as, first moving STS-1 circuits, then moving STS-3c circuits, subsequently moving STS-12c circuits, etc.

In some embodiments, the fragmentation of network bandwidth may be analyzed by portions such as quarters, prior to any migration. For example, if the lowest quarter of a fiber line is below a certain portion of fragmentation, migration may not occur in that quarter. The computer 112 may analyze the first forty-eight slots of an OC-192 and may determine if fragmentation is below a specified level in that quarter of the bandwidth. If fragmentation is below a specified level, then no circuits in that quarter may be migrated. The computer 112 may then analyze a next quarter of bandwidth. In some embodiments, the computer 112 may backfill fragmented bandwidth by moving one or more circuits into unallocated slots into the portion of a line that is fragmented. For example, the computer 112 may identify three non-contiguous unallocated timeslots in the first forty-eight slots of an OC-192. The computer 112 may then identify three STS-1 circuits in the top quarter of the OC-192 (i.e., slots 145-192). The three identified circuits in the top quarter of the OC-192 may then be migrated to backfill the identified gaps. The computer 112 may start with the higher slots and work backwards. These circuits may be migrated to the identified unallocated slots in the lowest quarter of the OC-192. The circuits in the top quarter of the OC-192 may then be coalesced by one or more migrations. The coalescing may provide three contiguous timeslots in the top quarter which may enable the provisioning of an STS-3c. The same backfilling may be done using circuits of higher speeds, such as STS-3c circuits, if the identified unallocated slots in the lower bandwidth contain three or more contiguous slots. In some embodiments, groups of contiguous STS-1 circuits may be identified to migrate to disparate unallocated slots. This may result in a larger range of contiguous bandwidth and may enable the provisioning of larger circuits.

In some embodiments, the provisioning of network bandwidth and/or the migration of network bandwidth may be implemented by networking equipment. For example, network elements 102, 104, 106, and 108 may be Add-Drop Multiplexers (ADMs). Network elements 102, 104, 106, and/or 108 may provision network bandwidth using one or more processes, hardware and/or executing one or more portions of code designed to reduce fragmentation of unallocated bandwidth. In one or more embodiments, network elements 102, 104, 106, and/or 108 may utilize one or more methods, processes, hardware components, and/or portions of executable code to migrate bandwidth in order to reduce fragmentation of unallocated bandwidth.

The computer 112 may produce a report, a listing, a display, an email or otherwise provide information associated with bandwidth allocation and/or fragmentation. The computer 112 may also generate a report or other listing associated with a planned migration or regrooming schedule. This may enable the scheduling of one or more outages and the notification of one or more users.

The various components of system 100 as shown in FIG. 1 may be further duplicated, combined and/or integrated to support various applications and platforms. Additional elements may also be implemented in the systems described above to support various applications.

Figure 2:
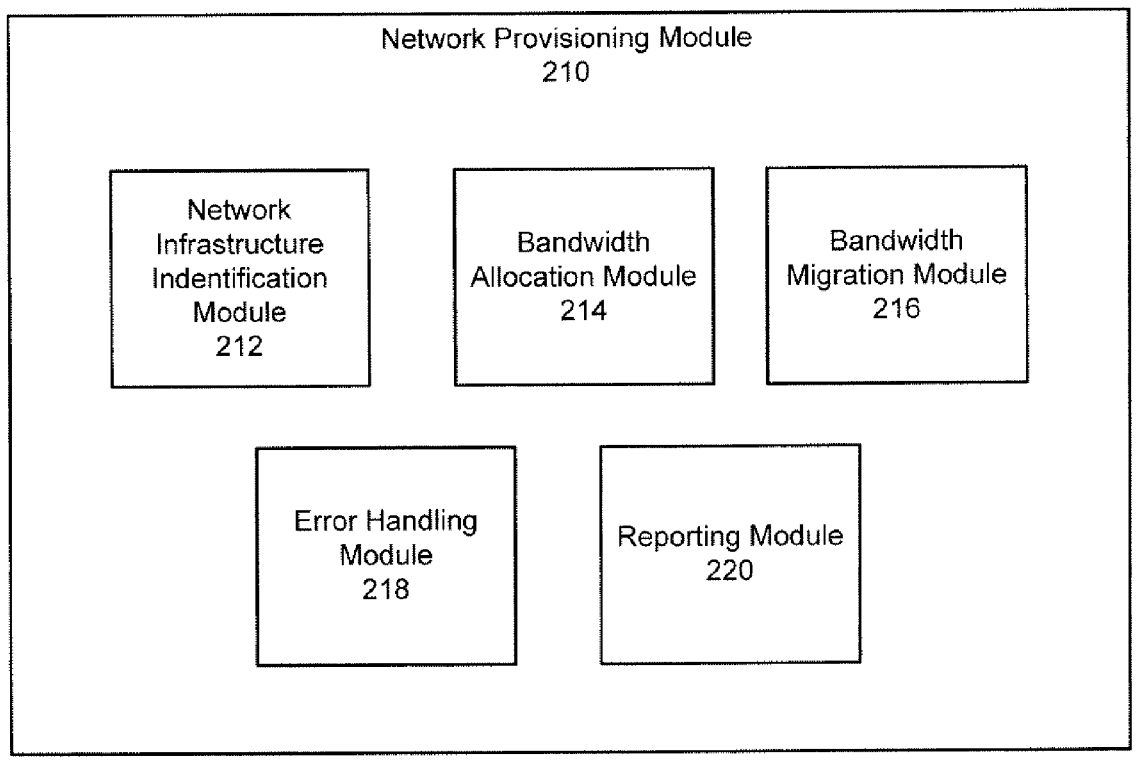
FIG. 2 depicts a block diagram of a module for allocating network bandwidth, in accordance with an exemplary embodiment.

Referring to FIG. 2, a block diagram of a module for allocating network bandwidth is depicted, in accordance with an exemplary embodiment. As illustrated, network provisioning module 210 may contain, network infrastructure identification module 212, bandwidth allocation module 214, bandwidth migration module 216, error handling module 218, and reporting module 220. Network provisioning module 210 may be implemented on the computer 112 of system 100, or on network elements 102, 104, 106, 108, and/or 110. In some embodiments, different portions may be implemented on different network elements.

Network provisioning module 210 may utilize one or more components to allocate network bandwidth. Network provisioning module 210 may also enable the migration and/or regrooming of network bandwidth.

Network infrastructure identification module 212 may receive data associated with allocated and unallocated network bandwidth for one or more network links. Network infrastructure identification module 212 may receive data via an interface or by user input. Network infrastructure identification module 212 may query other network components, such as a management information base, in order to identify network bandwidth. Network infrastructure identification module 212 may analyze allocated and unallocated bandwidth and may provide information and statistics on bandwidth allocation.

Bandwidth allocation module 214 may receive one or more requests for network provisioning. Bandwidth allocation module 214 may utilize one or more processes, hardware components and/or portions of executable code to identify one or more portions of unallocated bandwidth to provision a requested network connection. Bandwidth allocation module 214 may utilize different processes, hardware components and/or portions of executable code to manage provisioning of bandwidth depending on the speed of a connection, whether the connection requires concatenated bandwidth, the topology of the network, and/or other network or provisioning request attributes.

Bandwidth migration module 216 may determine fragmentation of bandwidth and may generate one or more migration or regrooming plans for the bandwidth. Bandwidth migration module 216 may identify one or more network connections that may be migrated, times for migration of circuits, users impacted by the migration of one or more network connections, potential bandwidth coalesced by the migration of one or more network connections and/or other migration information. Bandwidth migration module 216 may execute one or more commands to migrate bandwidth.

Error handling module 218 may handle one or more errors encountered when analyzing, provisioning, migrating, and/or reporting on network bandwidth. For example, error handling module 218 may handle errors related to network bandwidth data input, errors associated with insufficient bandwidth for provisioning and/or migration, and/or other errors.

Reporting module 220 may produce one or more reports containing bandwidth allocation information, bandwidth fragmentation information, bandwidth migration plans, bandwidth provisioning plans and/or other network information. Reports may be printed, web based, sent in a text message or email, or stored as a file. Formatting options may enable the generation of one or more routing tables, outage notifications or other products.

Figure 3:
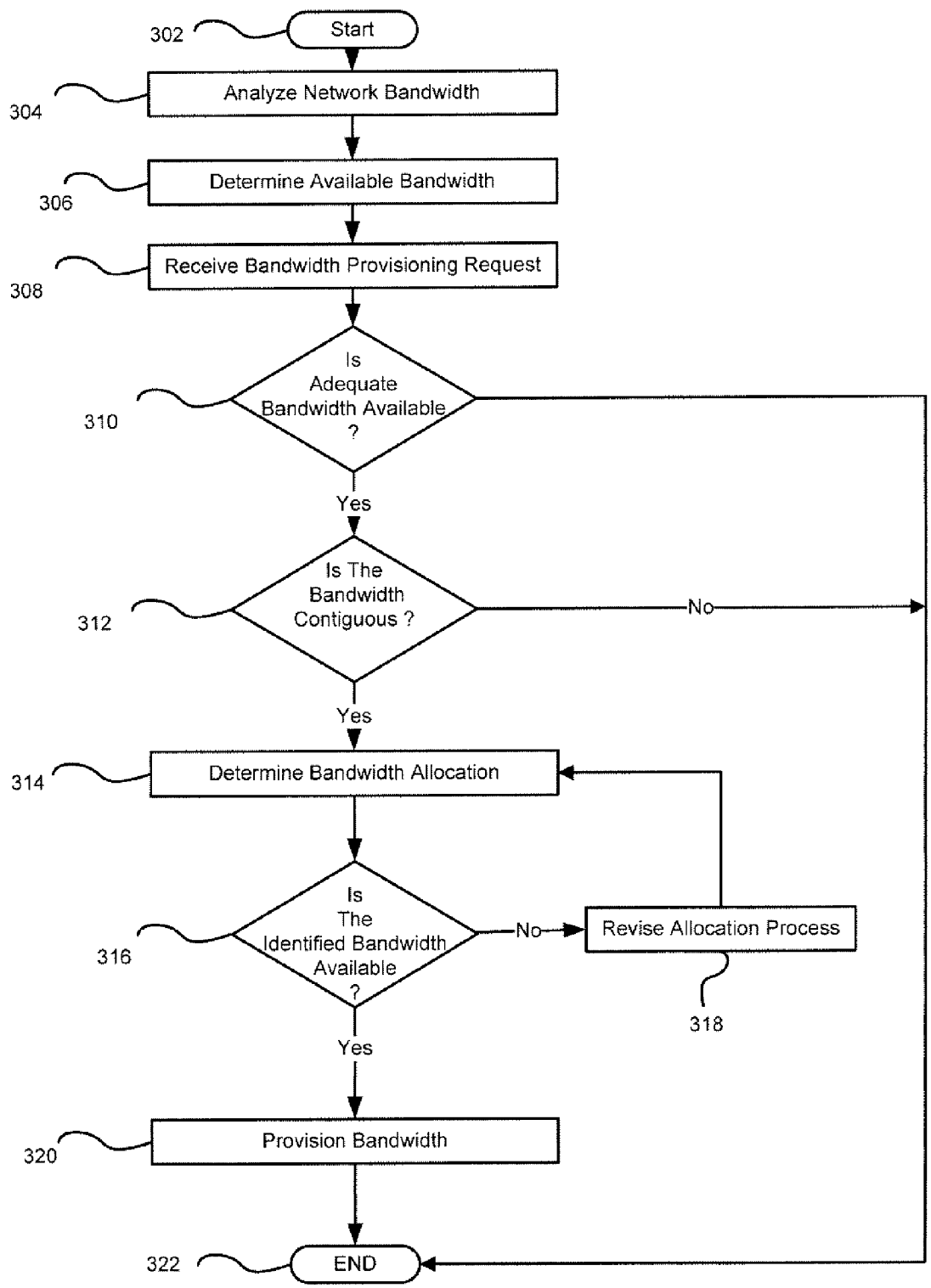
FIG. 3 depicts a flowchart of a method for allocating network bandwidth, in accordance with an exemplary embodiment.

FIG. 3 illustrates a flowchart of a method 300 for allocating network bandwidth, in accordance with an exemplary embodiment. This exemplary method 300 is provided by way of example, as there are a variety of ways to carry out the method. The method 300 shown in FIG. 3 can be executed or otherwise performed by one or a combination of various systems. The method 300 as described below may be carried out by the network bandwidth allocation system 100 shown in FIG. 1 and network provisioning module 210 shown in FIG. 2 by way of example, and various elements of the FIGS. 1 and 2 are referenced in explaining exemplary method 300 of FIG. 3. Each block shown in FIG. 3 represents one or more processes, methods or subroutines carried out in exemplary method 300. Referring to FIG. 3, exemplary method 300 may begin at block 302.

At block 304, network bandwidth may be analyzed. Network bandwidth may be received via an interface, via user input, and/or queried from one or more systems. Analysis of network bandwidth may include identification of a type of bandwidth available, such as an optical carrier line. Network bandwidth may be analyzed by the computer 112, network element 102, 104, 106, 108, and/or 110 of system 100. Network bandwidth may also be analyzed by network infrastructure identification module 212 of FIG. 2.

At block 306, the amount of unallocated and/or allocated bandwidth may be determined. In one or more embodiments, the level of bandwidth fragmentation may also be determined. In one or more embodiments, fragmentation may be determined per portion of bandwidth, such as per quarter of timeslots on a fiber line. Network bandwidth fragmentation may be analyzed by the computer 112, network element 102, 104, 106, 108, and/or 110 of system 100. Network bandwidth fragmentation may also be analyzed by one or more components network provisioning module 210 of FIG. 2.

At block 308, the method 300 may receive a bandwidth provisioning request from a user. For example, the computer 112 may receive a bandwidth provisioning request input by a user at a user interface of the computer 112 or sent electronically via another interface.

At block 310, the method 300 may determine whether adequate bandwidth is available to provision the requested network connection. The method 300 may compare the requested bandwidth with unallocated network bandwidth. In some embodiments, the computer 112 may compare the requested bandwidth with data associated with unallocated bandwidth stored on data storage 114. If adequate bandwidth is not available, the method may continue at block 322. If adequate bandwidth is available the method may continue at block 312.

At block 312, the method 300 may determine if the request for provisioning requires concatenated bandwidth and if the available bandwidth is contiguous. For example, if the request is for the provisioning of a STS-3c circuit, the method may determine if in the available bandwidth, three contiguous timeslots are available for provisioning. The computer 112 may compare the required contiguous timeslots for a requested circuit with the number of contiguous timeslots available. If insufficient contiguous bandwidth is available for the provisioning request the method may continue at block 322. If sufficient contiguous bandwidth is available, the method may continue at block 314.

At block 314, the method 300 may utilize one or more bandwidth allocation processes, hardware components and/or portions of executable code to identify one or more potential portions of bandwidth for provisioning the requested network connection. For example, bandwidth may be divided into one or more portions of contiguous timeslots to ensure that timeslots are allocated with sufficient space between them to allow the provisioning of subsequently provisioned circuits. Circuits requiring a single timeslot may be provisioned in a higher portion of the bandwidth to reduce fragmentation. In one or more embodiments, bandwidth may be divided into multiple portions and network connections of different types may be provisioned into different portions. The computer 112 may identify one or more potential portions of network bandwidth for provisioning. One or more components of network provisioning module 210 may also identify one or more potential portions of network bandwidth for provisioning.

At block 316, the method 300 may determine whether one or more portions of identified bandwidth are available for provisioning (e.g., unallocated). The computer 112 may determine whether one or more of the identified portions of network bandwidth are available for provisioning. One or more components of network provisioning module 210 may also determine whether one or more of the identified portions of network bandwidth are available for provisioning. If the identified bandwidth is not available the method may continue at block 318. If the identified bandwidth is available the method may continue at block 320.

At block 318, the method 300 may use an alternate process, use an alternate hardware component, or revise a scope of analyzed bandwidth in an existing process. For example, the method 300 may analyze a higher quarter of bandwidth for available bandwidth, may increment an integer in a process utilized to identify available bandwidth, may select an alternative process for identifying bandwidth, may reset one or more variables, may utilize alternate hardware components configured to analyze a different bandwidth, or may perform other actions to identify alternative bandwidth. The computer 112 may increment a variable in a process, use an alternate hardware component, or identify an alternative process. One or more components of network provisioning module 210 may also increment a variable in a process, use an alternate hardware component, or identify an alternative process. The method may then return to block 314.

At block 320, the method 300 may provision the requested network connection in the identified bandwidth. The computer 112 may provision the requested network connection. One or more components of network provisioning module 210 may also provision the requested network connection. Provisioning may utilize one or more network components, such as Add-Drop Multiplexers (ADM). In one or more embodiments, network elements 102, 104, 106, and/or 108 may be Add-Drop Multiplexers (ADM). The computer 112 may communicate with one or more network elements to allocate one or more timeslots to provision the requested network connection. In some embodiments, network elements 102, 104, 106, and/or 108 may perform one or more steps of method 300 and may subsequently provision the requested network connection.

At block 322, the method 300 may end.

Figure 4:
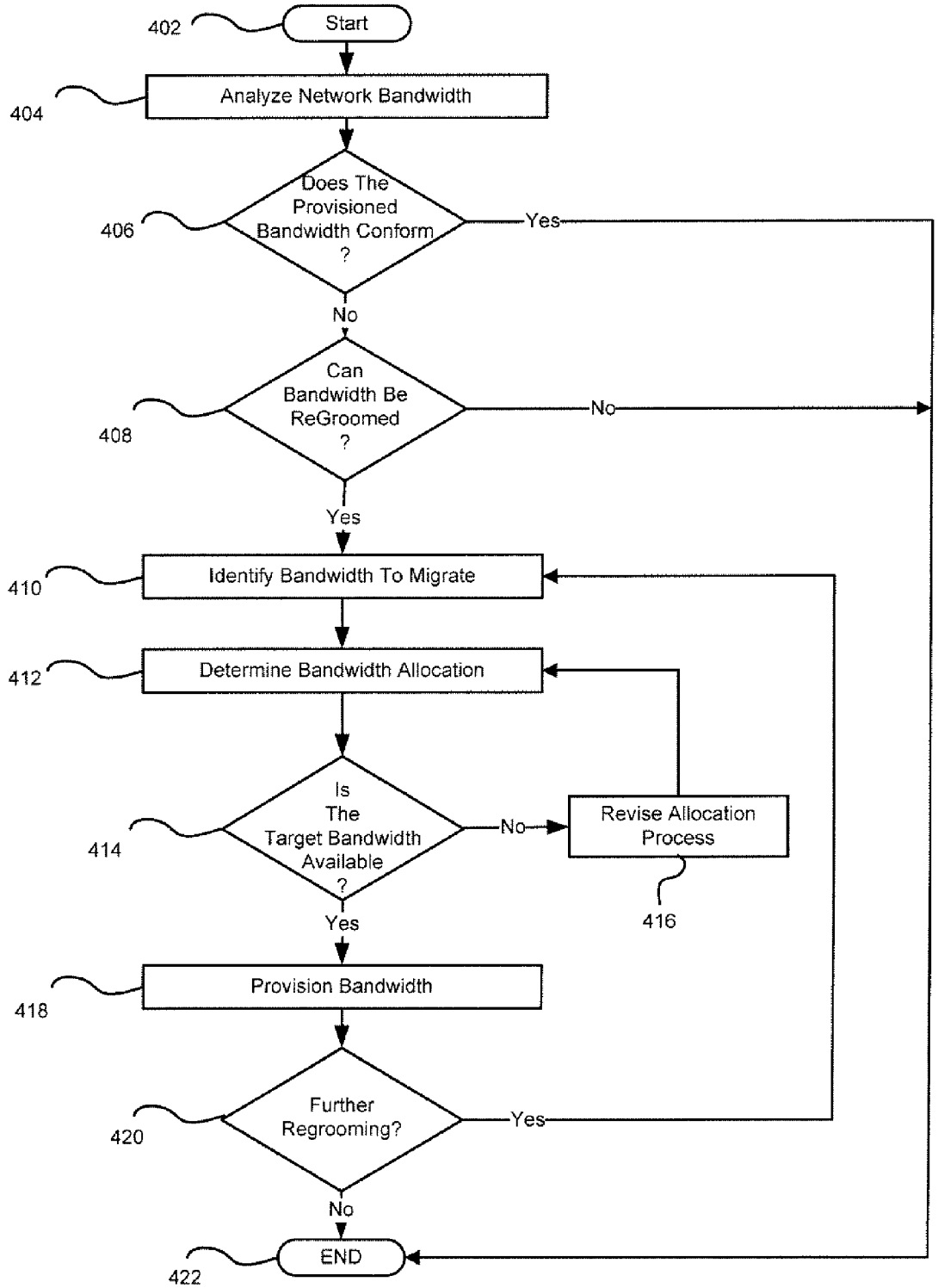
FIG. 4 depicts a flowchart of a method for re-provisioning network bandwidth, in accordance with an exemplary embodiment.

FIG. 4 illustrates a flowchart of a method 400 for re-provisioning network bandwidth, in accordance with an exemplary embodiment. This exemplary method 400 is provided by way of example, as there are a variety of ways to carry out the method. The method 400 shown in FIG. 4 can be executed or otherwise performed by one or a combination of various systems. The method 400 as described below may be carried out by the network analysis system 100 shown in FIG. 1 and network provisioning module 210 shown in FIG. 2 by way of example, and various elements of the FIGS. 1 and 2 are referenced in explaining exemplary method 400 of FIG. 4. Each block shown in FIG. 4 represents one or more processes, methods or subroutines carried out in exemplary method 400. Referring to FIG. 4, exemplary method 400 may begin at block 402.

At block 404, the method 400 may analyze network bandwidth. Data associated with network bandwidth allocation may be received from one or more network components and/or queried from one or more network components. The network bandwidth allocation data may then be analyzed by the computer 112 and/or one or more components of network provisioning module 210.

At block 406, the method 400 may determine a level of fragmentation, a percentage of bandwidth allocation, or other metrics of provisioned network bandwidth. Analysis may be performed by the computer 112 and/or network provisioning module 210. If bandwidth fragmentation is below a specified level and/or other metrics are met, then the provisioned bandwidth may conform and the method may continue at block 422. If bandwidth fragmentation is above a specified level and/or other metrics are not met, then the method may continue at block 408.

At block 408, the method 400 may determine whether the bandwidth may be regroomed and/or migrated. This may involve determining whether one or more service disruptions or outages may be acceptable to users of existing network connections. This may also involve determining whether it is possible to bridge and roll one or more network connections to minimize service disruptions. The determination may also be based on whether available bandwidth exists to migrate allocated bandwidth. The computer 112 may determine whether the bandwidth may be regroomed and/or migrated. One or more components of network provisioning module 210 may also determine whether the bandwidth may be regroomed and/or migrated.

At block 410, the method 400 may identify one or more portions of bandwidth to migrate. This may be done on the basis of available unallocated bandwidth to migrate to, on the basis of the potential impact of such a migration, on the potential decrease in fragmentation and/or on other factors. In some embodiments, smaller portions of bandwidth provisioned on a lower portion of bandwidth may be identified to migrate first. In some embodiments, the location or other characteristics of provisioned bandwidth may be run through a provisioning process, hardware component, and/or executable code module to determine whether the current allocation adheres to one or more specifications. The computer 112 and/or one or more components of network provisioning module 210 may identify one or more portions of bandwidth to migrate.

At block 412, the method 400 may utilize a bandwidth allocation process, hardware component, and/or executable code module to identify a target location for migrating identified bandwidth. Different bandwidth allocation processes, hardware components, and/or executable code modules may be utilized based on different connection types, different bandwidth types (e.g., optical carrier lines, T1 lines, etc), and other factors. In one or more embodiments, the usage of one or more portions of allocated bandwidth may be characterized. For example, certain provisioned circuits may be marked to avoid migration due to user concerns about any potential service disruption.

At block 414, the method 400 may determine whether the target bandwidth is available (e.g., unallocated). The computer 112 and/or one or more components of network provisioning module 210 may determine whether target bandwidth is available. If the target bandwidth is not available the method may continue at block 416. If the target bandwidth is available the method may continue at block 418.

At block 416, the method 400 may use an alternate process or revise a scope of analyzed bandwidth in an existing process. For example, the method 400 may analyze a higher quarter of bandwidth for available bandwidth, may increment an integer in a process utilized to identify target bandwidth, may select an alternative process, hardware component, and/or executable code module for identifying target bandwidth, may reset one or more variables, or may perform other actions to identify alternative target bandwidth. The computer 112 and/or one or more components of network provisioning module 210 may increment a variable in a process and/or select an alternative process. The method may then return to block 412.

At block 418, the method 400 may provision the identified bandwidth in the target bandwidth. In one or more embodiments, provisioning may occur at off-peak times to minimize any potential service disruption. In one or more embodiments, migrating may utilize a bridge and roll capability of networking equipment and/or other features to minimize service disruptions.

At block 420, the method 400 may determine whether further regrooming and/or bandwidth migration is possible and/or desirable. In one or more embodiments, this may be realized by determining a fragmentation level for the bandwidth, such as the percentage of fragmentation of allocated and/or unallocated bandwidth on a fiber line. If the fragmentation is above a specified level or if other metrics are not satisfied, the method may continue at block 410. If the fragmentation is below a specified level or if other metrics are satisfied, the method 400 may continue at block 422. The computer 112 and/or one or more components of network provisioning module 210 may determine whether further regrooming and/or bandwidth migration is possible and/or desirable.

At block 422, the method 400 may end.

FIG. 5 may be a table of allocated bandwidth, in accordance with an exemplary embodiment.

In one or more embodiments, FIG. 5 may represent the first forty timeslots of an OC-48 line. The first column may indicate the timeslot number. The second through twelfth columns may indicate an exemplary provisioning of a particular circuit speed. The first row may indicate the type of circuit being provisioned in that column ("the requested circuit", e.g. STS-12c, STS-3c, STS-1, etc.). The characters "- - - " in a timeslot may indicate the timeslots or containers have previously been provisioned. The character "X" in a timeslot may indicate that the timeslot is being used to provision the requested circuit for that column. For example, in column 2, an STS-12c is being provisioned. No prior allocations have been made in the 40 timeslots (i.e., no timeslots are marked with "- - -") so timeslots one through twelve may provide the twelve contiguous timeslots required for the STS-12c. In one or more embodiments, the determination of which of the one or more portions of unallocated bandwidth may result in less fragmentation of remaining unallocated network bandwidth may identify a number corresponding to a starting point of one or more portions of contiguous bandwidth for the request by calculating (n*(Integer−1)+1), wherein n may represent the number of contiguous bandwidth portions requested and Integer may be a specified integer. In the example of column 2, the specified integer may be 1 and thus the calculation may result in a starting timeslot being calculated as (12*(1−1)+1)= 1, where 1 has been specified as the integer and 12 has been substituted for n. Hence this may result in a starting timeslot of 1. Other methods, processes, hardware components, and/or portions of executable code may be utilized.

Referring to column 3, an exemplary provisioning of an STS-3c is depicted according to an exemplary embodiment. As depicted in column 3, the first twelve slots may be occupied by previously provisioned bandwidth. The determination of timeslot 13 as a starting timeslot for the STS-3c may be represented as (3*(5−1)+1)=13. Thus, the determination may have been made that timeslots 1, 4, 7, and 10 (as derived utilizing integers 1-4 in the above formula) have previously been allocated for other circuits. In one or more embodiments, this determination may be made by the computer 112 of FIG. 1, iterating through the calculations and comparing the results with data representing allocated and/or unallocated bandwidth.

Columns 4, 5, 7, 8, 11 and 12 may be examples of provisioning STS-1 circuits according to an embodiment. STS-1 circuits may be provisioned into the highest numbered portion of unallocated bandwidth in the lowest quarter of network bandwidth which contains sufficient unallocated network bandwidth. FIG. 5 may depict the first forty slots of OC-48 and thus the lowest quarter of the bandwidth may be timeslots 1-12, the next highest quarter may be timeslots 24-13. In column 4, the first twelve timeslots may be previously allocated, thus the STS-1 may be provisioned in timeslot 24, the highest timeslot of the second lowest quarter. In column 5, timeslots 1-12 and 24 may be previously allocated and thus the STS-1 may be provisioned in timeslot 23. Similar logic may be utilized to derive the timeslots for the examples depicted in columns 7, 8, and 11.

Column 9 may be an exemplary provisioning of a STS-12c circuit. As depicted, columns 1-18 and 21-24 may have previously been allocated for other circuits. The determination of timeslot 25 as a starting timeslot for the STS-12c may be represented as (12*(3−1)+1)=25. In this example three may have been utilized as an integer because lower integers may have yielded previously allocated or unavailable timeslots. In one or more embodiments, other methods, processes, hardware components, and/or portions of executable code may be utilized. Similar logic may be utilized to provision bandwidth on other sizes of fiber optic lines such as OC-192s, OC-768s, etc. Additionally, similar logic may be utilized to provision other types of circuits, such as STS-48cs, STS-192cs, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   receiving, at a computing device, network bandwidth information identifying one or more portions of sequentially numbered bandwidth for a network;
   receiving, at a computing device, a request for network bandwidth;
   identifying, at a computing device, one or more portions of network bandwidth to fulfill the request, wherein the identification comprises:
      utilizing the network bandwidth information to identify one or more portions of unallocated network bandwidth with sufficient capacity for the request; and
      determining which of the one or more portions of unallocated network bandwidth will result in less fragmentation of remaining unallocated network bandwidth, wherein the determination comprises identifying a highest numbered portion of unallocated bandwidth in a lowest quarter of network bandwidth which contains sufficient unallocated network bandwidth for the request; and
   provisioning the one or more identified portions of unallocated network bandwidth.

2. The method of claim 1, wherein the request for bandwidth is a request for non-contiguous bandwidth.

3. The method of claim 1, wherein the determination of which of the one or more portions of unallocated bandwidth will result in less fragmentation of remaining unallocated network bandwidth further comprises identifying a number corresponding to a starting point of one or more portions of contiguous bandwidth for the request by calculating (n*(Integer−1)+1), wherein n represents the number of contiguous bandwidth portions requested and Integer is a specified integer.

4. The method of claim 3, further comprising incrementing Integer in the event that the identified number corresponds to allocated bandwidth.

5. The method of claim 1, wherein the network is a SONET (Synchronous Optical Networking) based network.

6. The method of claim 5, wherein the one or more portions of network bandwidth comprise timeslots.

7. The method of claim 1, wherein utilizing the network bandwidth information to identify one or more portions of unallocated network bandwidth with sufficient capacity for the request comprises identifying one or more portions of unallocated network bandwidth on a single SONET (Synchronous Optical Networking) line.

8. A non-transitory computer readable media comprising stored executable code to perform the acts of the method of claim 1.

9. A system, comprising:
   a processor communicatively coupled to a network and configured to:
      receive network bandwidth information for a network;
      receive a request for network bandwidth;
      utilize the network bandwidth information to identify one or more portions of network bandwidth to fulfill the request, wherein the identification comprises:
         identifying one or more portions of unallocated network bandwidth with sufficient capacity for the request; and determining which of the one or more portions of unallocated network bandwidth will result in less fragmentation of remaining unallocated network bandwidth, wherein the determination comprises identifying a highest numbered portion of unallocated bandwidth in a lowest quarter of network bandwidth which contains sufficient unallocated network bandwidth for the request; and provision the one or more identified portions of unallocated network bandwidth.

10. The system of claim 9, wherein the request for bandwidth is a request non-contiguous bandwidth.

11. The system of claim 9, wherein the determination of which of the one or more portions of unallocated bandwidth will result in less fragmentation of remaining unallocated network bandwidth further comprises configuring the processor to identify a number corresponding to a starting point of one or more portions of contiguous bandwidth for the request by calculating (n*(Integer−b 1) 1), wherein n represents the number of contiguous bandwidth portions requested and Integer is a specified integer.

12. The system of claim 11, further comprising incrementing Integer in the event that the identified number corresponds to allocated bandwidth.

13. The system of claim 9, wherein the network is a SONET (Synchronous Optical Networking) based network.

* * * * *